(12) United States Patent
Brubaker et al.

(10) Patent No.: US 11,522,767 B2
(45) Date of Patent: Dec. 6, 2022

(54) SYSTEM FOR REAL-TIME IMITATION NETWORK GENERATION USING ARTIFICIAL INTELLIGENCE

(71) Applicant: BANK OF AMERICA CORPORATION, Charlotte, NC (US)

(72) Inventors: Mark Earl Brubaker, Simi Valley, CA (US); Jason T. Yeung, Forest Hills, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 5 days.

(21) Appl. No.: 17/077,615

(22) Filed: Oct. 22, 2020

(65) Prior Publication Data
US 2022/0131762 A1 Apr. 28, 2022

(51) Int. Cl.
*H04L 29/08* (2006.01)
*H04L 41/14* (2022.01)
*G06K 9/62* (2022.01)
*H04L 9/40* (2022.01)
*H04L 41/16* (2022.01)
*H04L 43/045* (2022.01)
*H04L 43/50* (2022.01)
*G06N 20/00* (2019.01)
*G06V 10/75* (2022.01)

(52) U.S. Cl.
CPC .......... *H04L 41/145* (2013.01); *G06K 9/6256* (2013.01); *G06N 20/00* (2019.01); *G06V 10/754* (2022.01); *H04L 41/16* (2013.01); *H04L 43/045* (2013.01); *H04L 43/50* (2013.01); *H04L 63/1433* (2013.01)

(58) Field of Classification Search
CPC ...................................... H04L 41/145
See application file for complete search history.

(56) References Cited

U.S. PATENT DOCUMENTS

| | | | |
|---|---|---|---|
| 6,922,022 B2 | 7/2005 | Bucks et al. |
| 6,930,598 B2 | 8/2005 | Weiss |
| 6,940,230 B2 | 9/2005 | Myron et al. |
| 6,950,725 B2 | 9/2005 | von Kannewurff et al. |
| 6,963,285 B2 | 11/2005 | Fischer et al. |
| 6,967,448 B2 | 11/2005 | Morgan et al. |
| 6,969,954 B2 | 11/2005 | Lys |
| 6,972,525 B2 | 12/2005 | Bucks et al. |
| 6,975,079 B2 | 12/2005 | Lys et al. |

(Continued)

*Primary Examiner* — Adnan M Mirza
(74) *Attorney, Agent, or Firm* — Moore & Van Allen PLLC; Anup Shrinivasan Iyer (57) ABSTRACT

Systems, computer program products, and methods are described herein for real-time imitation network generation using artificial intelligence. The present invention is configured to electronically receive, from a computing device of a user, a real dataset; initiate one or more machine learning algorithms on the real dataset; determine, using the one or more machine learning algorithms, one or more data distribution parameters associated with the real dataset; electronically receive, from the computing device of the user, a first shift parameter; skew the one or more data distribution parameters using the first shift parameter to generate one or more skewed data distribution parameters; and generate, using the one or more machine learning algorithms, an imitation dataset using the one or more skewed data distribution parameters.

20 Claims, 3 Drawing Sheets

(56) References Cited

U.S. PATENT DOCUMENTS

| | | |
|---|---|---|
| 6,989,807 B2 | 1/2006 | Chiang |
| 6,990,349 B1 | 1/2006 | Idrissi |
| 6,990,394 B2 | 1/2006 | Pasternak |
| 8,046,583 B2 | 10/2011 | Taniguchi |
| 9,674,219 B2 | 6/2017 | Selander et al. |
| 9,781,137 B2 | 10/2017 | Szucs et al. |
| 9,826,399 B2 | 11/2017 | Peterson et al. |
| 10,039,174 B2 | 7/2018 | Oliver et al. |
| 10,085,328 B2 | 9/2018 | Barna et al. |
| 10,148,672 B2 | 12/2018 | Deshpande et al. |
| 10,419,938 B2 | 9/2019 | Chen et al. |
| 10,531,545 B2 | 1/2020 | Barna et al. |
| 10,834,596 B2 | 11/2020 | Choi et al. |
| 11,044,276 B2 | 6/2021 | Briggs et al. |
| 2019/0245754 A1* | 8/2019 | Greene, Jr. ............ H04L 41/142 |
| 2020/0202257 A1* | 6/2020 | Lee ........................ G06N 20/20 |

* cited by examiner

FIGURE 1

```
                                    ┌─ 200
                                    ▼
┌─────────────────────────────────────────────────────────────────────┐
│   ELECTRONICALLY RECEIVE, FROM A COMPUTING DEVICE OF A USER, A REAL │
│                              DATASET                                │
│                               202                                   │
└─────────────────────────────────────────────────────────────────────┘
                                    ▼
┌─────────────────────────────────────────────────────────────────────┐
│     INITIATE ONE OR MORE MACHINE LEARNING ALGORITHMS ON THE REAL    │
│                              DATASET                                │
│                               204                                   │
└─────────────────────────────────────────────────────────────────────┘
                                    ▼
┌─────────────────────────────────────────────────────────────────────┐
│  DETERMINE, USING THE ONE OR MORE MACHINE LEARNING ALGORITHMS, ONE  │
│   OR MORE DATA DISTRIBUTION PARAMETERS ASSOCIATED WITH THE REAL     │
│                              DATASET                                │
│                               206                                   │
└─────────────────────────────────────────────────────────────────────┘
                                    ▼
┌─────────────────────────────────────────────────────────────────────┐
│    ELECTRONICALLY RECEIVE, FROM THE COMPUTING DEVICE OF THE USER, A │
│                         FIRST SHIFT PARAMETER                       │
│                               208                                   │
└─────────────────────────────────────────────────────────────────────┘
                                    ▼
┌─────────────────────────────────────────────────────────────────────┐
│  SKEW THE ONE OR MORE DATA DISTRIBUTION PARAMETERS USING THE FIRST  │
│  SHIFT PARAMETER TO GENERATE ONE OR MORE SKEWED DATA DISTRIBUTION   │
│                            PARAMETERS                               │
│                               210                                   │
└─────────────────────────────────────────────────────────────────────┘
                                    ▼
┌─────────────────────────────────────────────────────────────────────┐
│  GENERATE, USING THE ONE OR MORE MACHINE LEARNING ALGORITHMS, AN    │
│  IMITATION DATASET USING THE ONE OR MORE SKEWED DATA DISTRIBUTION   │
│                            PARAMETERS                               │
│                               212                                   │
└─────────────────────────────────────────────────────────────────────┘
```

SYSTEM FOR REAL-TIME IMITATION NETWORK GENERATION USING ARTIFICIAL INTELLIGENCE

FIELD OF THE INVENTION

The present invention embraces a system for real-time imitation network generation using artificial intelligence.

BACKGROUND

Entities often engage with third parties to simulate intrusion vectors to analyze various areas of the entities' technology infrastructure to determine points of potential access. However, these simulations do not always represent the actuality of intrusions experienced by the entities. To overcome the deficiencies of simulated analysis, entities have implemented honeypot security mechanisms. Honeypot is a security mechanism that creates a virtual trap to lure unauthorized access by deliberately presenting a compromised component (hardware and/or software). The compromised components that are presented are intended to look like legitimate, vulnerable systems to attract unauthorized access attempts. However, generating legitimate imitation components can be challenging.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for real-time imitation network generation using artificial intelligence is presented. The system comprising: at least one non-transitory storage device; and at least one processing device coupled to the at least one non-transitory storage device, wherein the at least one processing device is configured to: electronically receive, from a computing device of a user, a real dataset; initiate one or more machine learning algorithms on the real dataset; determine, using the one or more machine learning algorithms, one or more data distribution parameters associated with the real dataset; electronically receive, from the computing device of the user, a first shift parameter; skew the one or more data distribution parameters using the first shift parameter to generate one or more skewed data distribution parameters; and generate, using the one or more machine learning algorithms, an imitation dataset using the one or more skewed data distribution parameters.

In some embodiments, the at least one processing device is further configured to: electronically receive, from the computing device of the user, one or more conditional parameters; determine that the imitation dataset meets one or more requirements associated with the conditional parameters; and finalize the imitation dataset based on at least determining that the imitation dataset meets the one or more requirements associated with the conditional parameters.

In some embodiments, the at least one processing device is further configured to: determine that the imitation dataset does not meet the one or more requirements associated with the conditional parameters; initiate an iterative optimization algorithm on the one or more skewed data distribution parameters, wherein initiating further comprises: update, using the iterative optimization algorithm, the one or more skewed data distribution parameters; generate an updated imitation dataset based on at least the one or more updated skewed data distribution parameters; and determine whether the updated imitation dataset meets the one or more requirements associated with the conditional parameters; and finalize the imitation dataset based on at least determining that the updated imitation dataset meets the one or more requirements associated with the conditional parameters.

In some embodiments, the at least one processing device is further configured to: determine one or more network security features associated with a network environment, wherein the one or more network security features are configured to protect one or more datasets stored in one or more data repositories from one or more unauthorized access attempts; store the imitation dataset in the one or more data repositories within the network environment; and remove at least one of the one or more network security features from protecting the imitation dataset within the network environment.

In some embodiments, the at least one processing device is further configured to: continuously monitor the one or more unauthorized access attempts associated with the imitation dataset; and determine one or more types of unauthorized access attempts based on at least monitoring the one or more unauthorized access attempts associated with the imitation dataset.

In some embodiments, the at least one processing device is further configured to: determine one or more actions executed on the imitation dataset during the one or more unauthorized access attempts.

In some embodiments, the at least one processing device is further configured to: generate one or more penetration test scenarios based on at least the one or more types of unauthorized access attempts associated with the imitation dataset; and initiate the one or more penetration test scenarios on one or more real datasets stored in the one or more data repositories within the network environment.

In some embodiments, the at least one processing device is further configured to: determine one or more automated network security responses to the one or more penetration test scenarios; determine that the one or more automated network security responses successfully blocked and reported each of the one or more unauthorized access attempts; generate a dashboard report indicating the one or more penetration test scenarios initiated on the one or more real datasets stored in the one or more data repositories and the one or more automated network security responses to each of the one or more penetration test scenarios; and transmit control signals configured to cause the computing device of the user to display the dashboard report.

In some embodiments, the at least one processing device is further configured to: determine that the one or more automated network security responses have not successfully blocked and/or reported each of the one or more unauthorized access attempts; determine the one or more unauthorized access attempts that were not successfully blocked and/or reported; and determine one or more actions to be executed in response to the one or more unauthorized access attempts that were not successfully blocked and/or reported, wherein the execution of the one or more actions will successfully block and report the one or more unauthorized access attempts that were not successfully blocked and/or reported.

In some embodiments, the at least one processing device is further configured to: update the one or more network security features with the one or more actions.

In another aspect, a computer program product for real-time imitation network generation using artificial intelligence is presented. The computer program product comprising a non-transitory computer-readable medium comprising code causing a first apparatus to: electronically receive, from a computing device of a user, a real dataset; initiate one or more machine learning algorithms on the real dataset; determine, using the one or more machine learning algorithms, one or more data distribution parameters associated with the real dataset; electronically receive, from the computing device of the user, a first shift parameter; skew the one or more data distribution parameters using the first shift parameter to generate one or more skewed data distribution parameters; and generate, using the one or more machine learning algorithms, an imitation dataset using the one or more skewed data distribution parameters.

In yet another aspect, a method for real-time imitation network generation using artificial intelligence is presented. The method comprising: electronically receiving, from a computing device of a user, a real dataset; initiating one or more machine learning algorithms on the real dataset; determining, using the one or more machine learning algorithms, one or more data distribution parameters associated with the real dataset; electronically receiving, from the computing device of the user, a first shift parameter; skewing the one or more data distribution parameters using the first shift parameter to generate one or more skewed data distribution parameters; and generating, using the one or more machine learning algorithms, an imitation dataset using the one or more skewed data distribution parameters.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

Cybersecurity is the practice of protecting networks, systems, hardware and data from digital intrusions. Entities such as financial institutions, tech companies, hospitals, government agencies and just about every other sector are investing in cybersecurity infrastructure to protect their business practices and customers that trust them with their data. A strong security infrastructure includes multiple layers of network security features dispersed throughout an entity's systems, applications, and networks. Entities often engage with third parties to simulate intrusion vectors to analyze various areas of the entities' technology infrastructure to determine points of potential access. However, these simulations do not always represent the actuality of intrusions experienced by the entities. To overcome the deficiencies of simulated analysis, entities have implemented honeypot security mechanisms. Honeypot is a security mechanism that creates a virtual trap to lure unauthorized access by deliberately presenting a compromised component (hardware and/or software). The compromised components that are presented are intended to look like legitimate, vulnerable systems to attract unauthorized access attempts. However, generating legitimate imitation components can be challenging.

The present invention provides the functional benefit of modelling the generation of imitation datasets to be presented as honeypots based on real datasets. To achieve this, the present invention implements machine learning techniques to learn structural information from the real datasets and generate imitation datasets according to the learned structure of the real dataset. Generating an imitation dataset based on a real dataset not only presents a legitimate focal point of access for unauthorized access attempts, but also, allows for determining the types of unauthorized access attempts, and the effects of the unauthorized access attempts on the system components. Once these unauthorized access attempts are identified and categorized, the present invention provides the functional benefit of generation potential penetration test scenarios to be implemented on specific environments and/or applications. In doing so, the present invention determines the robustness of the automated responses of the existing network security infrastructure. Unlike simulated intrusion vectors, the potential penetration test scenarios are generated based on unauthorized access attempts previously recorded within the technology infrastructure of the same entity. Thus, the present invention is an improvement over existing simulation techniques that use a broad spectrum approach towards intrusion detection, by generating penetration test scenarios that are based on historical intrusion data.

Figure 1:
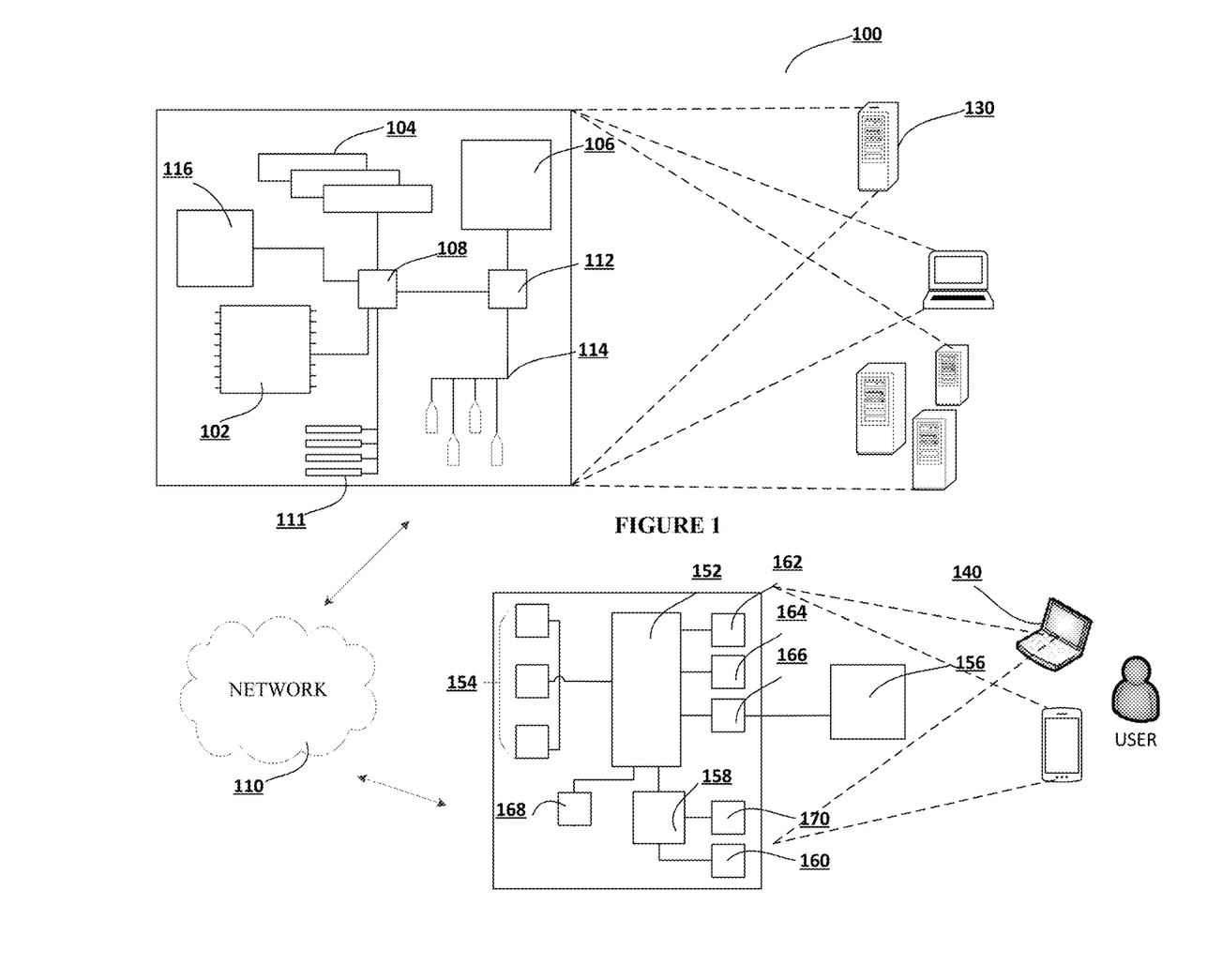
FIG. 1 presents an exemplary block diagram of the system environment for real-time generation of imitation network and responsive actions based on unauthorized access events recorded by the imitation network, in accordance with an embodiment of the invention.

FIG. 1 presents an exemplary block diagram of the system environment for real-time generation of imitation network and responsive actions based on unauthorized access events recorded by the imitation network 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units.

Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system/network environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system/network environment 100 illustrated in FIG. 1 is exemplary and that other embodiments may vary. As another example, in some embodiments, the system environment may include more, fewer, or different components. As another example, in some embodiments, some or all of the portions of the system/network environment 100 may be combined into a single portion. Likewise, in some embodiments, some or all of the portions of the system 130 may be separated into two or more distinct portions.

Figure 2:
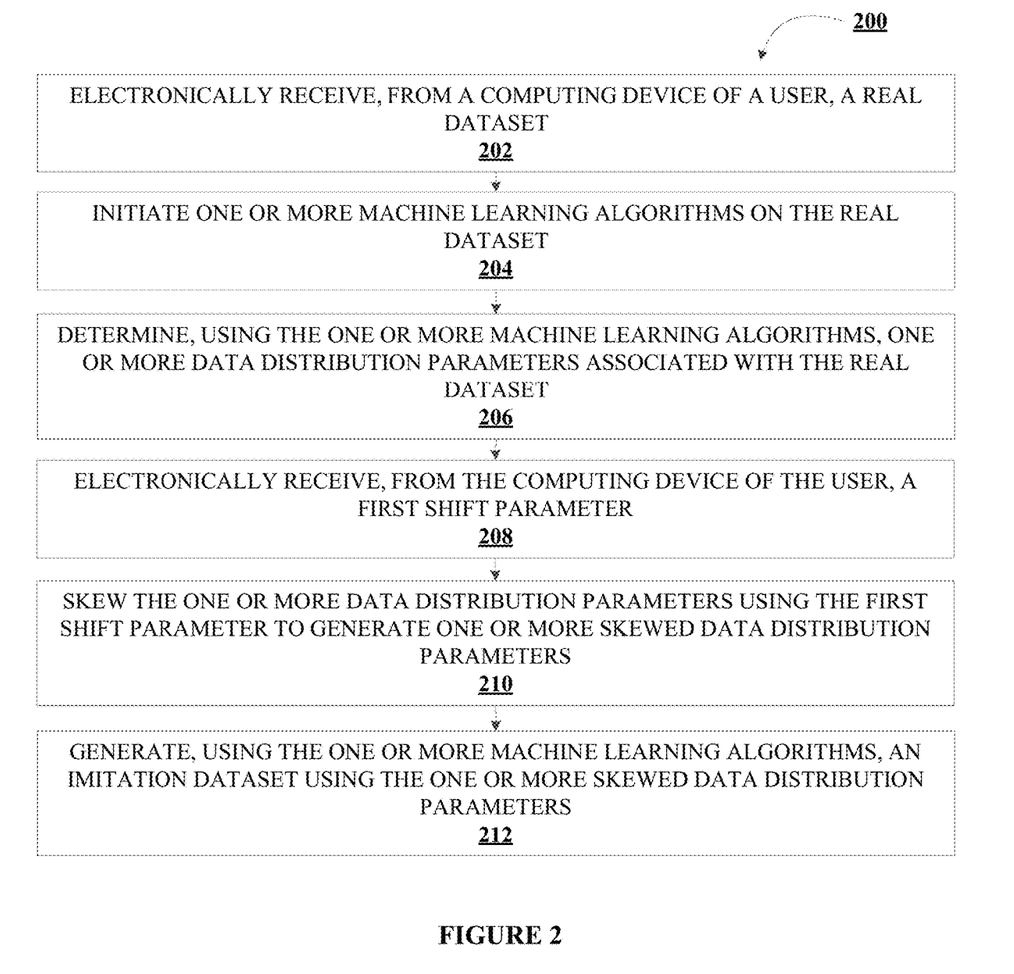
FIG. 2 illustrates a process flow for real-time imitation network generation using artificial intelligence, in accordance with an embodiment of the invention.

FIG. 2 illustrates a process flow for real-time imitation network generation using artificial intelligence 200, in accordance with an embodiment of the invention. As shown in block 202, the process flow includes electronically receiving, from a computing device of a user, a real dataset. In some embodiments, a real dataset may be a collection of information compiled and stored in one or more data repositories across the network environment and used by entities to provide products and/or services to their customers. In some embodiments, the real dataset may be used by any of the components of the network/system environment 100 described herein. In some other embodiments, the real dataset may not be used by any of the components of the network/system environment 100 directly, but are used by components of other devices that often interact with the network/system environment 100.

Next, as shown in block 204, the process flow includes initiating one or more machine learning algorithms on the real dataset. By initiating the machine learning algorithms on the real dataset, the system may be configured to learn and model the structure of the real dataset. In some embodiments, the system may be configured to initiate and implement any of the following machine learning algorithms/techniques to achieve the necessary outcome: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system environment 100. Further, any suitable model (e.g., machine learning, non-machine learning, etc.) can be used in generating data relevant to the system 130.

Next, as shown in block 206, the process flow includes determining, using the one or more machine learning algorithms, one or more data distribution parameters associated with the real dataset. In some embodiments, the structure of the real dataset may be defined by one or more data distribution parameters. By learning the structure of the real dataset using the machine learning algorithms, the system may be configured to determine the one or more distribution parameters that are fundamental to the structure of the real dataset. In some embodiments, the one or more distribution parameters associated with the real dataset may be specific to a technology environment or an application within the network/system environment 100.

Next, as shown in block 208, the process flow includes electronically receiving, from the computing device of the user, a first shift parameter. In some embodiments, the shift parameter may be introduced to the one or more data distribution parameters to ensure that any dataset generated using the distribution parameters are similar enough to lure unauthorized access attempts but dissimilar to the real dataset to preserve sensitive information. In one aspect, the shift parameter may be determined by the user. In another aspect, the shift parameter may be automatically determined by the system. In some embodiments, the shift parameter may be specific to the technology environment or application in which the real dataset is typically used. For example, if the real dataset contains sensitive information that is used in customer-facing financial institution applications, the shift parameter may be greater in magnitude to ensure that the degree of dissimilarity between the dataset generated based on distribution parameters extracted from the real dataset and the real dataset are high to ensure protection of the sensitive information.

Next, as shown in block 210, the process flow includes skewing the one or more data distribution parameters using the first shift parameter to generate one or more skewed data distribution parameters. In some embodiments, skewness may be a measure of how much the dataset deviates from the real dataset. By skewing introducing skewness to one or more data distribution parameters of the real dataset, the system may be configured to ensure that any dataset generated using the skewed distribution parameters are similar enough to lure unauthorized access attempts but dissimilar to the real dataset to preserve sensitive information. In some embodiments, the user may introduce multiple shift parameters to the data distribution parameters so that not all values in the real dataset are skewed by the same amount. In this regard, the user may introduce a first shift parameter to a first set of data distribution parameters and a second shift parameter to a second set of data distribution parameters.

Next, as shown in block 212, the process flow includes generating, using the one or more machine learning algorithms, an imitation dataset using the one or more skewed data distribution parameters. As described herein, the imitation dataset may be include artificial data that is generated based on the data distribution parameters associated with the real dataset.

In some embodiments, the system may be configured to electronically receive, from the computing device of the user, one or more conditional parameters. In some embodiments, the one or more conditional parameters may be specific to an environment and/or an application to ensure that the imitation dataset generated is the type of data that can be processed by the environment and/or application. In some embodiments, the conditional parameters may be used to determine the degree of dissimilarity between the real dataset and the imitation dataset. In response, the system may be configured to determine that the imitation dataset meets one or more requirements associated with the conditional parameters. In response, the system may be configured to finalize the imitation dataset based on at least determining that the imitation dataset meets the one or more requirements associated with the conditional parameters.

In some embodiments, the system may be configured to determine that the imitation dataset does not meet the one or more requirements associated with the conditional parameters. In response, the system may be configured to initiate an iterative optimization algorithm on the one or more skewed data distribution parameters. In this regard, the system may be configured to update, using the iterative optimization algorithm, the one or more skewed data distribution parameters. In one aspect, the system may be configured to update the skewed data distribution parameters by changing the values of the skewed data distribution parameters by a predetermined value. In response, the system may be configured to generate an updated imitation dataset based on at least the one or more updated skewed data distribution parameters. Once the updated imitation dataset is generated, the system may be configured to determine whether the updated imitation dataset meets the one or more requirements associated with the conditional parameters. In response, the system may be configured to finalize the imitation dataset based on at least determining that the updated imitation dataset meets the one or more requirements associated with the conditional parameters. If the updated imitation dataset still does not meet the one or more requirements associated with the conditional parameters, the system may be configured to iteratively execute the optimization algorithm to update the skewed data distribution parameters and subsequently update the imitation database until the requirements are met.

In some embodiments, the system may be configured to determine one or more network security features associated with a network environment. In one aspect, the one or more network security features are configured to protect one or more datasets stored in one or more data repositories from one or more unauthorized access attempts. Next, the system may be configured to store the imitation dataset in the one or more data repositories within the network environment. In response, the system may be configured to remove at least one of the one or more network security features from protecting the imitation dataset within the network environment. Examples of removing network security features may include misconfiguring servers that route data packets to the imitation dataset, removing secure access points within specific points in the network to enable unauthorized access to the imitation database, implement a single-factor authentication instead of multi-factor authentication to access the imitation database, retain the default configurations for the imitation dataset, remove or weaken any firewall protecting the imitation database, and/or the like.

Figure 3:
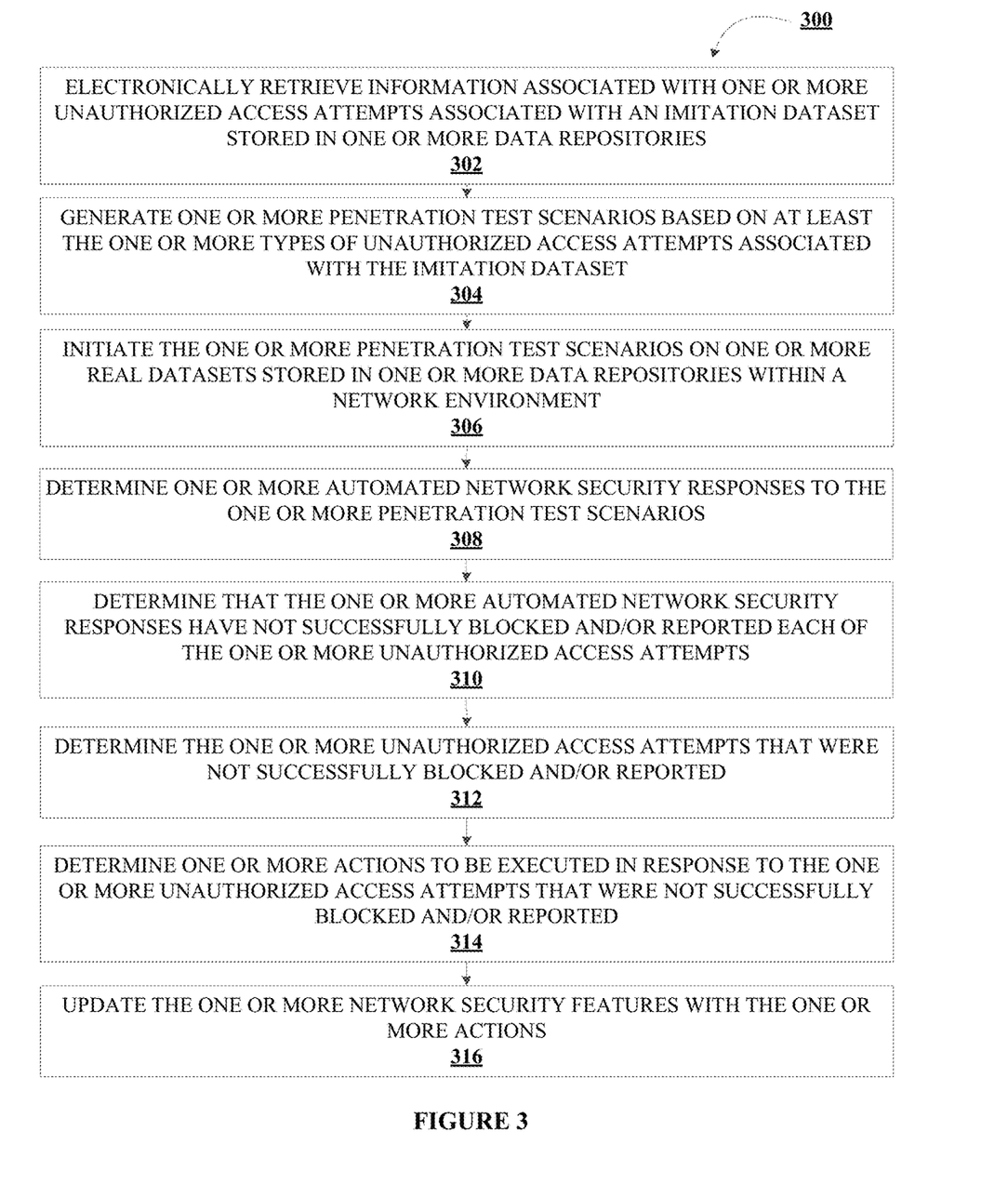
FIG. 3 illustrates a process flow for generating responsive actions based on unauthorized access events associated with imitation networks, in accordance with an embodiment of the invention.

FIG. 3 illustrates a process flow for generating responsive actions based on unauthorized access events associated with imitation networks 300, in accordance with an embodiment of the invention. As shown in block 302, the process flow includes electronically retrieving information associated with one or more unauthorized access attempts associated with an imitation dataset stored in one or more data repositories. In one aspect, the information associated with the one or more unauthorized access attempts comprises at least one or more types of unauthorized access attempts. In some embodiments, the system may be configured to continuously monitor the one or more unauthorized access attempts associated with the imitation dataset. In response, the system may be configured to determine one or more types of unauthorized access attempts based on at least monitoring the one or more unauthorized access attempts associated with the imitation dataset.

In some embodiments, the types of unauthorized access attempts may include at least a GET request that attempts to retrieve information from the imitation database, POST request that attempts to have the imitation database accept data enclosed in the body of the request message, PUT request to change the configuration of servers associated with the imitation database, OPTION request to obtain information associated with the connections surrounding the imitation database, HEAD request to obtain headers of any requests received by the imitation database without receiving responses, remote code execution, implementing foreign mining scripts, authentication credential retrieval, and/or the like. In some embodiments, the system may be configured to determine one or more specific actions executed on the imitation dataset during the one or more unauthorized access attempts.

Next, as shown in block 304, the process flow includes generating one or more penetration test scenarios based on at least the one or more types of unauthorized access attempts associated with the imitation dataset. In some embodiments, the system may be configured to generate the one or more penetration test scenarios for specific environments or applications within the network. In one aspect, the system may be configured to generate the one or more penetration test scenarios for environments and/or applications that have access to the one or more data repositories in which the imitation dataset was stored. In another aspect, the system may be configured to generate the penetration test scenarios for environments and/or application that are same or similar to the environment and/or applications that have/had access to the one or more data repositories in which the imitation dataset was stored. In some embodiments, the one or more penetration testing scenarios may include one or more actions that are same or similar to the one or more specific actions executed on the imitation dataset during the one or more unauthorized access attempts. In this way, the penetration testing scenario may be able to replicate the real-world unauthorized access attempts to determine the responsiveness of the network security features.

Next, as shown in block 306, the process flow includes initiating the one or more penetration test scenarios on one or more real datasets stored in one or more data repositories within a network environment. As described herein, the system may be configured to initiate the one or more penetration test scenarios on real datasets stored in data repositories and associated with a specific environment and/or application. In this way, each environment and/or application may be tested separately for its security responsiveness.

Next, as shown in block 308, the process flow includes determining one or more automated network security responses to the one or more penetration test scenarios. In some embodiments, the network security responses may be a structured to effectively identify the unauthorized access attempt, mitigate any damage caused by the actions, identifying a resolution to the unauthorized access attempt, and securing any vulnerability to prevent future unauthorized access attempts.

Next, as shown in block 310, the process flow includes determining that the one or more automated network security responses have not successfully blocked and/or reported each of the one or more unauthorized access attempts. In some embodiments, blocking and/or reporting the one or more unauthorized access attempts may include at least detection of the unauthorized access attempt, i.e., identifying access vectors, looking for signs of an incident, and prioritization, developing a containment strategy, identifying mitigating the hosts and systems that are subject to the unauthorized access attempt, any determining post-incident activity to secure any vulnerable points in the environment and/or application.

Next, as shown in block 312, the process flow includes determining the one or more unauthorized access attempts that were not successfully blocked and/or reported. In some embodiments, the system may be configured to identify the types of unauthorized access attempts that were not successfully blocked and/or reported.

Next, as shown in block 314, the process flow includes determining one or more actions to be executed in response to the one or more unauthorized access attempts that were not successfully blocked and/or reported. In one aspect, the execution of the one or more actions will successfully block and report the one or more unauthorized access attempts that were not successfully blocked and/or reported.

Next, as shown in block 316, the process flow includes updating the one or more network security features with the one or more actions.

In some embodiments, the system may be configured to determine that the one or more automated network security responses successfully blocked and reported each of the one or more unauthorized access attempts. In response, the system may be configured to generate a dashboard report indicating the one or more penetration test scenarios initiated on the one or more real datasets stored in the one or more data repositories and the one or more automated network security responses to each of the one or more penetration test scenarios. In response, the system may be configured to transmit control signals configured to cause the computing device of the user to display the dashboard report.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for real-time imitation network generation using artificial intelligence, the system comprising:
    at least one non-transitory storage device; and
    at least one processing device coupled to the at least one non-transitory storage device, wherein the at least one processing device is configured to:
    electronically receive, from a computing device of a user, a real dataset, wherein the real dataset is used in a first technology environment, wherein the real dataset contains sensitive information;
    initiate one or more machine learning algorithms on the real dataset;
    determine, using the one or more machine learning algorithms, one or more data distribution parameters associated with the real dataset, wherein the one or more distribution parameters defining a structure of the real dataset;
    determine that a required degree of dissimilarity between the real dataset and an imitation data that is to be generated using the real dataset,
    determine a first shift parameter based on at least the required degree of dissimilarity, wherein the first shift parameter is specific to the first technology environment;
    skew the one or more data distribution parameters using the first shift parameter to generate one or more skewed data distribution parameters; and
    generate, using the one or more machine learning algorithms, an imitation dataset using the one or more skewed data distribution parameters.

2. The system of claim 1, wherein the at least one processing device is further configured to:
    electronically receive, from the computing device of the user, one or more conditional parameters;
    determine that the imitation dataset meets one or more requirements associated with the conditional parameters; and
    finalize the imitation dataset based on at least determining that the imitation dataset meets the one or more requirements associated with the conditional parameters.

3. The system of claim 2, wherein the at least one processing device is further configured to:
    determine that the imitation dataset does not meet the one or more requirements associated with the conditional parameters;
    initiate an iterative optimization algorithm on the one or more skewed data distribution parameters, wherein initiating further comprises:
        updating, using the iterative optimization algorithm, the one or more skewed data distribution parameters;
        generating an updated imitation dataset based on at least the one or more updated skewed data distribution parameters; and
        determining whether the updated imitation dataset meets the one or more requirements associated with the conditional parameters; and
    finalize the imitation dataset based on at least determining that the updated imitation dataset meets the one or more requirements associated with the conditional parameters.

4. The system of claim 3, wherein the at least one processing device is further configured to:
    determine one or more network security features associated with a network environment, wherein the one or more network security features are configured to protect one or more datasets stored in one or more data repositories from one or more unauthorized access attempts;
    store the imitation dataset in the one or more data repositories within the network environment; and
    remove at least one of the one or more network security features from protecting the imitation dataset within the network environment.

5. The system of claim 4, wherein the at least one processing device is further configured to:
    continuously monitor the one or more unauthorized access attempts associated with the imitation dataset; and determine one or more types of unauthorized access attempts based on at least monitoring the one or more unauthorized access attempts associated with the imitation dataset.

6. The system of claim 5, wherein the at least one processing device is further configured to:
determine one or more actions executed on the imitation dataset during the one or more unauthorized access attempts.

7. The system of claim 6, wherein the at least one processing device is further configured to:
generate one or more penetration test scenarios based on at least the one or more types of unauthorized access attempts associated with the imitation dataset; and
initiate the one or more penetration test scenarios on one or more real datasets stored in the one or more data repositories within the network environment.

8. The system of claim 7, wherein the at least one processing device is further configured to:
determine one or more automated network security responses to the one or more penetration test scenarios;
determine that the one or more automated network security responses successfully blocked and reported each of the one or more unauthorized access attempts;
generate a dashboard report indicating the one or more penetration test scenarios initiated on the one or more real datasets stored in the one or more data repositories and the one or more automated network security responses to each of the one or more penetration test scenarios; and
transmit control signals configured to cause the computing device of the user to display the dashboard report.

9. The system of claim 8, wherein the at least one processing device is further configured to:
determine that the one or more automated network security responses have not successfully blocked and/or reported each of the one or more unauthorized access attempts;
determine the one or more unauthorized access attempts that were not successfully blocked and/or reported; and
determine one or more actions to be executed in response to the one or more unauthorized access attempts that were not successfully blocked and/or reported, wherein the execution of the one or more actions will successfully block and report the one or more unauthorized access attempts that were not successfully blocked and/or reported.

10. The system of claim 9, wherein the at least one processing device is further configured to:
update the one or more network security features with the one or more actions.

11. A computer program product for real-time imitation network generation using artificial intelligence, the computer program product comprising a non-transitory computer-readable medium comprising code causing a first apparatus to:
electronically receive, from a computing device of a user, a real dataset, wherein the real dataset is used in a first technology environment, wherein the real dataset contains sensitive information;
initiate one or more machine learning algorithms on the real dataset;
determine, using the one or more machine learning algorithms, one or more data distribution parameters associated with the real dataset, wherein the one or more distribution parameters defining a structure of the real dataset;

determine that a required degree of dissimilarity between the real dataset and an imitation data that is to be generated using the real dataset,
determine a first shift parameter based on at least the required degree of dissimilarity, wherein the first shift parameter is specific to the first technology environment;
skew the one or more data distribution parameters using the first shift parameter to generate one or more skewed data distribution parameters; and
generate, using the one or more machine learning algorithms, an imitation dataset using the one or more skewed data distribution parameters.

12. The computer program product of claim 11, wherein the first apparatus is further configured to:
electronically receive, from the computing device of the user, one or more conditional parameters;
determine that the imitation dataset meets one or more requirements associated with the conditional parameters; and
finalize the imitation dataset based on at least determining that the imitation dataset meets the one or more requirements associated with the conditional parameters.

13. The computer program product of claim 12, wherein the first apparatus is further configured to:
determine that the imitation dataset does not meet the one or more requirements associated with the conditional parameters;
initiate an iterative optimization algorithm on the one or more skewed data distribution parameters, wherein initiating further comprises:
updating, using the iterative optimization algorithm, the one or more skewed data distribution parameters;
generating an updated imitation dataset based on at least the one or more updated skewed data distribution parameters; and
determining whether the updated imitation dataset meets the one or more requirements associated with the conditional parameters; and
finalize the imitation dataset based on at least determining that the updated imitation dataset meets the one or more requirements associated with the conditional parameters.

14. The computer program product of claim 13, wherein the first apparatus is further configured to:
determine one or more network security features associated with a network environment, wherein the one or more network security features are configured to protect one or more datasets stored in one or more data repositories from one or more unauthorized access attempts; store the imitation dataset in the one or more data repositories within the network environment; and
remove at least one of the one or more network security features from protecting the imitation dataset within the network environment.

15. The computer program product of claim 14, wherein the first apparatus is further configured to:
continuously monitor the one or more unauthorized access attempts associated with the imitation dataset; and
determine one or more types of unauthorized access attempts based on at least monitoring the one or more unauthorized access attempts associated with the imitation dataset.

16. The computer program product of claim 15, wherein the first apparatus is further configured to:

determine one or more actions executed on the imitation dataset during the one or more unauthorized access attempts.

17. The computer program product of claim 16, wherein the first apparatus is further configured to:
    generate one or more penetration test scenarios based on at least the one or more types of unauthorized access attempts associated with the imitation dataset; and
    initiate the one or more penetration test scenarios on one or more real datasets stored in the one or more data repositories within the network environment.

18. The computer program product of claim 17, wherein the first apparatus is further configured to:
    determine one or more automated network security responses to the one or more penetration test scenarios;
    determine that the one or more automated network security responses successfully blocked and reported each of the one or more unauthorized access attempts;
    generate a dashboard report indicating the one or more penetration test scenarios initiated on the one or more real datasets stored in the one or more data repositories and the one or more automated network security responses to each of the one or more penetration test scenarios; and
    transmit control signals configured to cause the computing device of the user to display the dashboard report.

19. The computer program product of claim 18, wherein the first apparatus is further configured to:
    determine that the one or more automated network security responses have not successfully blocked and/or reported each of the one or more unauthorized access attempts;
    determine the one or more unauthorized access attempts that were not successfully blocked and/or reported; and
    determine one or more actions to be executed in response to the one or more unauthorized access attempts that were not successfully blocked and/or reported, wherein the execution of the one or more actions will successfully block and report the one or more unauthorized access attempts that were not successfully blocked and/or reported.

20. A method for real-time imitation network generation using artificial intelligence, the method comprising:
    electronically receiving, from a computing device of a user, a real dataset, wherein the real dataset is used in a first technology environment, wherein the real dataset contains sensitive information;
    initiating one or more machine learning algorithms on the real dataset;
    determining, using the one or more machine learning algorithms, one or more data distribution parameters associated with the real dataset, wherein the one or more distribution parameters defining a structure of the real dataset;
    determining that a required degree of dissimilarity between the real dataset and an imitation data that is to be generated using the real dataset;
    determining a first shift parameter based on at least the required degree of dissimilarity, wherein the first shift parameter is specific to the first technology environment;
    skewing the one or more data distribution parameters using the first shift parameter to generate one or more skewed data distribution parameters; and
    generating, using the one or more machine learning algorithms, an imitation dataset using the one or more skewed data distribution parameters.

* * * * *